(12) United States Patent
Koo et al.

(10) Patent No.: US 8,861,361 B2
(45) Date of Patent: Oct. 14, 2014

(54) APPARATUS AND METHOD FOR FAST LOAD BALANCING BANDWIDTH ALLOCATION BASED ON BINARY SEARCH

(75) Inventors: Han Seung Koo, Daejeon (KR); Dong Joon Choi, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 51 days.

(21) Appl. No.: 13/612,529

(22) Filed: Sep. 12, 2012

(65) Prior Publication Data

US 2013/0128732 A1 May 23, 2013

(30) Foreign Application Priority Data

Nov. 21, 2011 (KR) .................. 10-2011-0121397

(51) Int. Cl.
*H04L 12/26* (2006.01)
*H04L 12/803* (2013.01)
*H04L 12/28* (2006.01)

(52) U.S. Cl.
CPC .......... *H04L 47/125* (2013.01); *H04L 12/2801* (2013.01)
USPC .......................................... 370/235; 370/230

(58) Field of Classification Search
CPC ......... H04L 12/66; H04L 12/46; H04L 5/003; H04L 45/16; H04L 12/43; H04J 3/1692; H04J 3/00; H04J 3/1682; H04Q 11/04
USPC ......... 370/401, 431–432, 437, 441–443, 458, 370/468, 395, 329, 335, 235
See application file for complete search history.

(56) References Cited

U.S. PATENT DOCUMENTS

| | | | |
|---|---|---|---|
| 6,236,678 B1 * | 5/2001 | Horton et al. | 375/222 |
| 7,002,899 B2 * | 2/2006 | Azenkot et al. | 370/208 |
| 2010/0157920 A1 * | 6/2010 | Choi et al. | 370/329 |
| 2013/0088961 A1 * | 4/2013 | Ramachandran et al. | 370/235 |

* cited by examiner

*Primary Examiner* — Kwang B Yao
*Assistant Examiner* — Syed M Bokhari
(74) *Attorney, Agent, or Firm* — William Park & Associates Patent Ltd.

(57) ABSTRACT

An apparatus and method for fast load balancing bandwidth allocation based on a binary search may be provided, wherein the apparatus may include a bandwidth allocation request receiving unit to receive a bandwidth allocation request signal from at least one modem, and a bandwidth allocation processing unit to allocate a bandwidth to an upstream channel of the at least one modem, using a load balancing algorithm, in response to the received bandwidth allocation request signal.

3 Claims, 8 Drawing Sheets

<Load balancing bandwidth allocation apparatus 300>

APPARATUS AND METHOD FOR FAST LOAD BALANCING BANDWIDTH ALLOCATION BASED ON BINARY SEARCH

CROSS-REFERENCE TO RELATED APPLICATION

This application claims the benefit of Korean Patent Application No. 10-2011-0121397, filed on Nov. 21, 2011, in the Korean Intellectual Property Office, the disclosure of which is incorporated herein by reference.

BACKGROUND

1. Field of the Invention

The present invention relates to an apparatus and method for fast load balancing bandwidth allocation based on a binary search, and more particularly, to a technical concept of bandwidth allocation for load balancing in a broadcast and communication system.

2. Description of the Related Art

In a broadcast and communication system, an amount of traffic to be input from modems through multiple upstream channels is to be balanced between channels, for efficient management of channels. In this instance, a technology for balancing the amount of traffic between channels may be referred to as a load balancing algorithm.

The load balancing algorithm may be implemented in a headend bandwidth allocation apparatus. The headend bandwidth allocation apparatus may allocate a bandwidth to an upstream channel using the load balancing algorithm when modems request for bandwidth allocation to the upstream channel.

In Data over Cable Service Interface Specification (DOCSIS), a headend cable modem termination system (CMTS) may allocate a bandwidth to cable modems (CMs) through use of a MAP message. Accordingly, load balancing may be achieved by adjusting contents written in the MAP message.

In DOCSIS, a bandwidth may be allocated based on a minislot, a unit of a timeslot. That is, the greater the size of a minislot written in the MAP message is, the wider bandwidth is allocated to the minislot. The CMs may be distinguished through use of a service identifier (SID) in the MAP message.

FIG. 1 illustrates a configuration of an MAP message used in DOCSIS according to a conventional art.

In DOCSIS, allocating a bandwidth to a plurality of upstream channels is referred to as segment allocation.

FIG. 2 illustrates an example of segment allocation used in DOCSIS according to a conventional art.

As illustrated in FIG. 2, when slots indicated using a first hatching pattern are distributed between channels more evenly, it may be said that better load balancing is performed.

SUMMARY

According to an aspect of the present invention, there is provided a load balancing bandwidth allocation apparatus, including a bandwidth allocation request receiving unit to receive a bandwidth allocation request signal from at least one modem, and a bandwidth allocation processing unit to allocate a bandwidth to an upstream channel of the at least one modem, using a load balancing algorithm, in response to the received bandwidth allocation request signal.

According to another aspect of the present invention, there is also provided a load balancing bandwidth allocation method, including receiving a bandwidth allocation request signal from at least one modem, and allocating a bandwidth to an upstream channel of the at least one modem, using a load balancing algorithm, in response to the received bandwidth allocation request signal, wherein the allocating may include normalizing minislots having different sizes, based on a smallest minislot among the minislots having different sizes.

According to an embodiment of the present invention, a load balancing bandwidth allocation algorithm that performs load balancing more rapidly may be provided.

According to an embodiment of the present invention, load balancing between channels may be achieved at a time of allocating a bandwidth in a broadcast and communication system rapidly.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
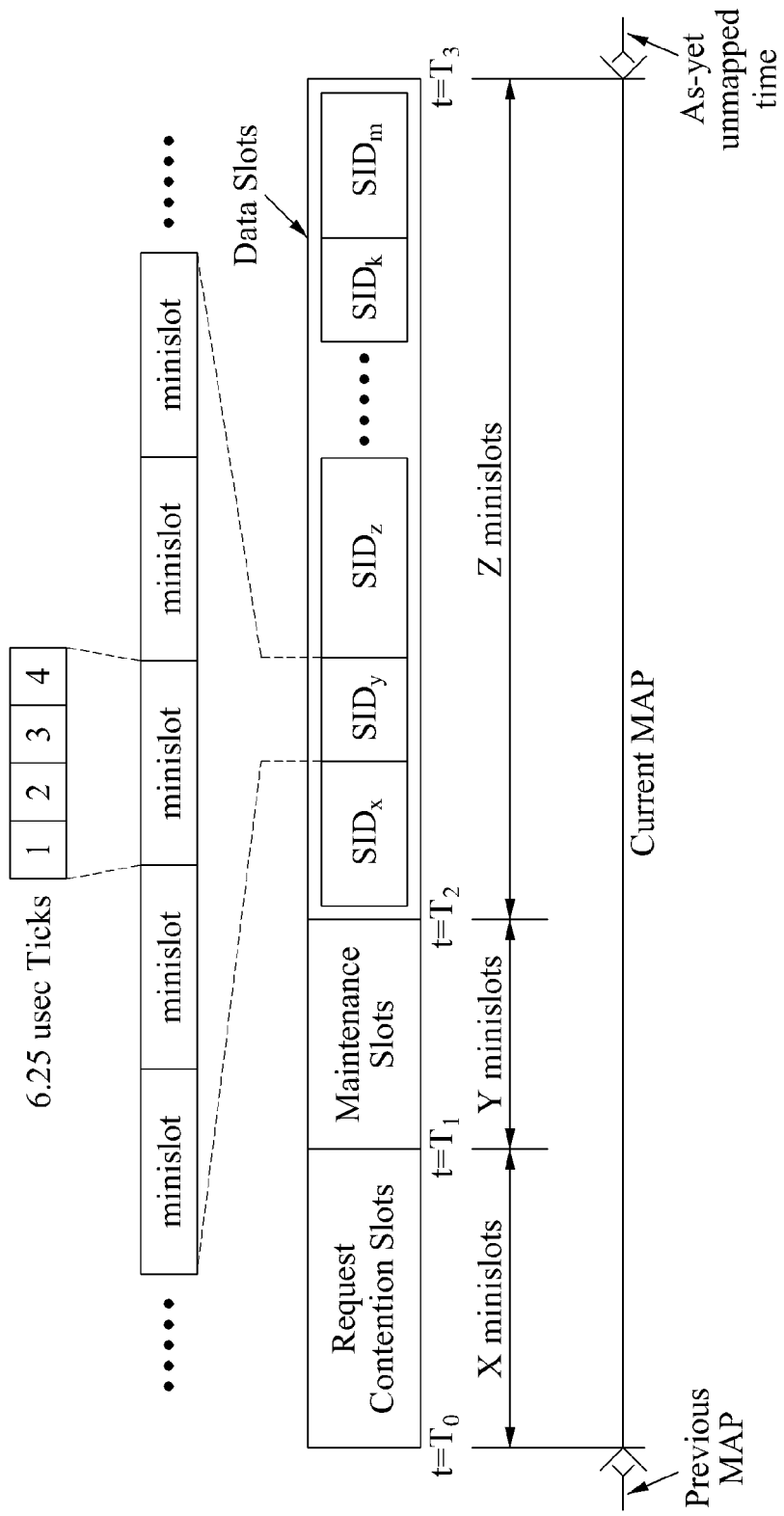
FIG. 1 illustrates a configuration of an MAP message used in Data over Cable Service Interface Specification (DOCSIS) according to a conventional art.
Figure 2:
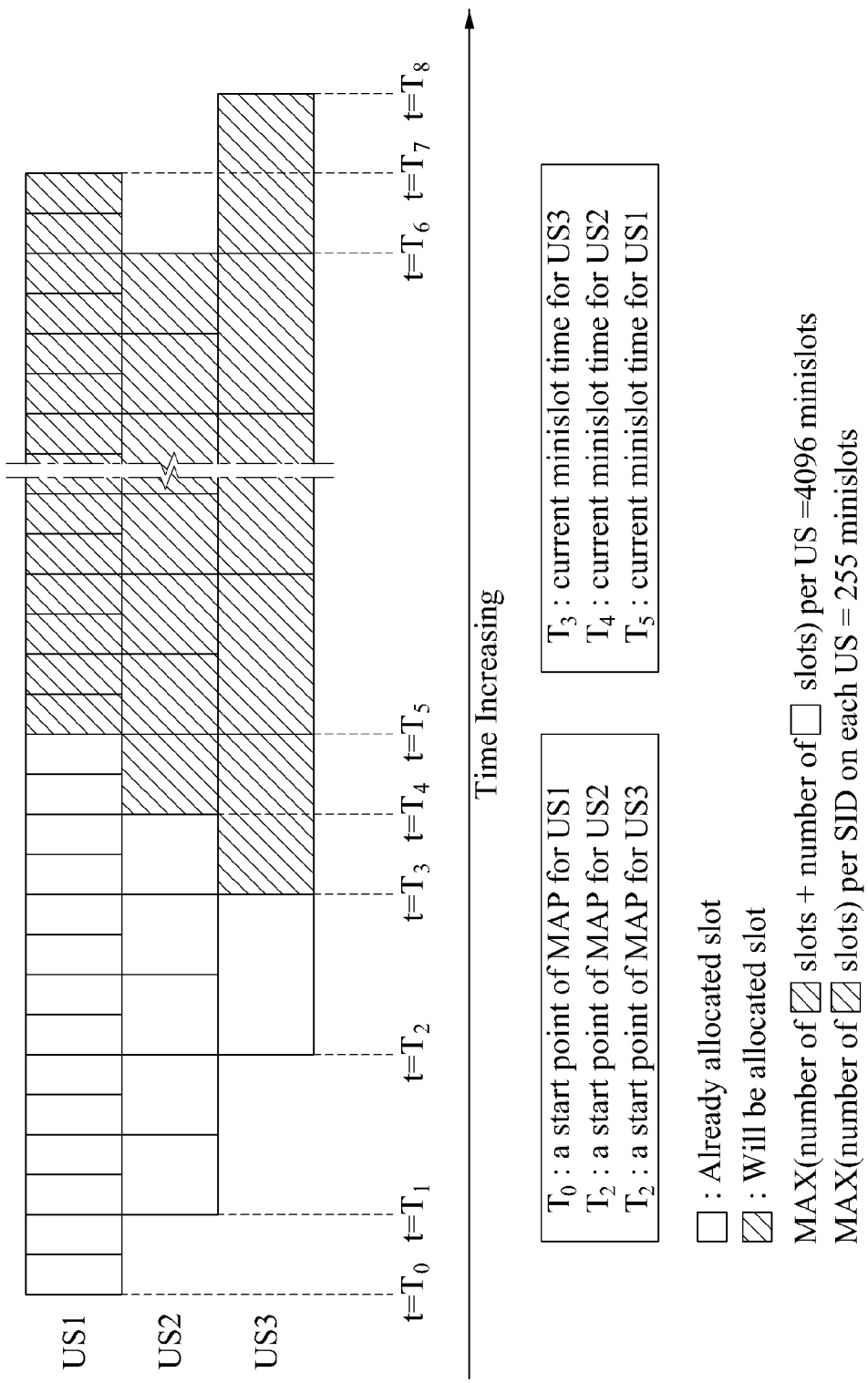
FIG. 2 illustrates an example of segment allocation used in DOCSIS according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined that a detailed description is related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

Figure 3:
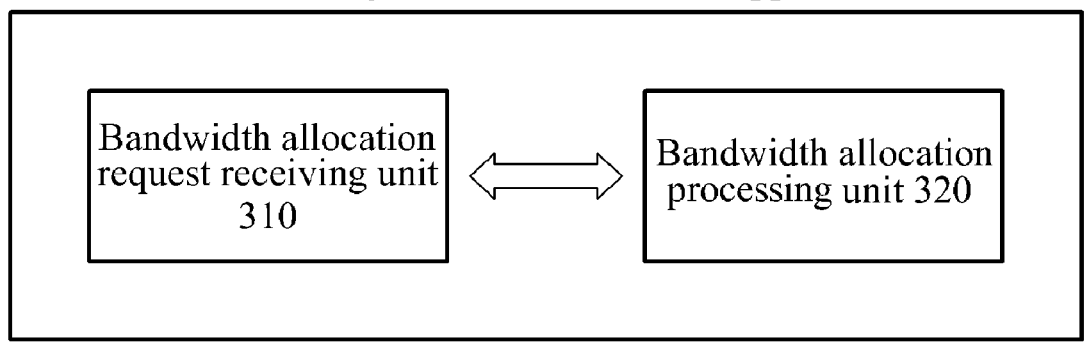
FIG. 3 is a block diagram illustrating a load balancing bandwidth allocation apparatus using a load balancing algorithm according to an embodiment of the present invention.

FIG. 3 is a block diagram illustrating a load balancing bandwidth allocation apparatus 300 using a load balancing algorithm according to an embodiment of the present invention.

Referring to FIG. 3, the apparatus 300 may include a bandwidth allocation request receiving unit 310, and a bandwidth allocation processing unit 320.

The bandwidth allocation request receiving unit 310 may receive a bandwidth allocation request signal from at least one modem.

That is, for efficient management of channels, an amount of traffic to be input from modems through multiple upstream channels is to be balanced between channels. In this instance, the bandwidth allocation request receiving unit 310 may receive a request for bandwidth allocation to an upstream channel, from the modems.

The bandwidth allocation processing unit 320 may allocate a bandwidth to an upstream channel of the at least one modem, using the load balancing algorithm, in response to the received bandwidth allocation request signal.

The bandwidth allocation processing unit 320 may perform the bandwidth allocation by performing normalization with respect to at least one minislot based on a smallest minislot, using the load balancing algorithm.

That is, the bandwidth allocation processing unit 320 may normalize the minislots having different sizes, based on the smallest minislot among the minislots having different sizes, using the load balancing algorithm.

In addition, the bandwidth allocation processing unit 320 may allocate the bandwidth to the upstream channel, by applying a binary search to the minislots having different sizes, using the load balancing algorithm.

In this instance, the binary search may be used to calculate an allocation length (alcLen) using a bit index (BitIdx) of a minislot, and to allocate a bandwidth to the upstream channel of the at least one modem, by reflecting, in the calculated allocation length, a minimum value (ptrNMT) in an allocation region.

For example, the bandwidth allocation processing unit 320 may set an initial value of the allocation length (alcLen) to "0," and set an initial value of the bit index (BitIdx) to "16."

Figure 4:
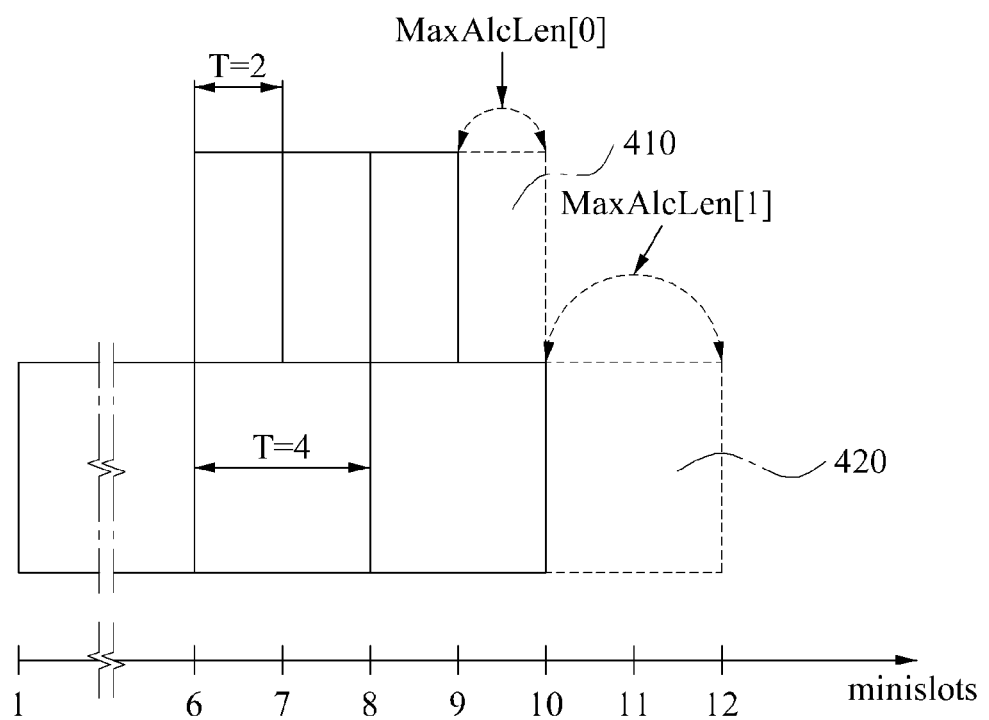
FIG. 4 illustrates allocation of a segment at a point in time based on a load balancing algorithm according to an embodiment of the present invention.

FIG. 4 illustrates allocation of a segment at a point in time based on a load balancing algorithm according to an embodiment of the present invention.

It may be assumed that two minislots having different sizes are provided.

In this instance, a size of one minislot 410 corresponds to T=2, and a size of the other minislot 420 corresponds to T=4. For ease of description, it may also be assumed that a maximum number of minislots that may be additionally allocated, at once, for each service identifier (SID) corresponds to "1."

Figure 5:
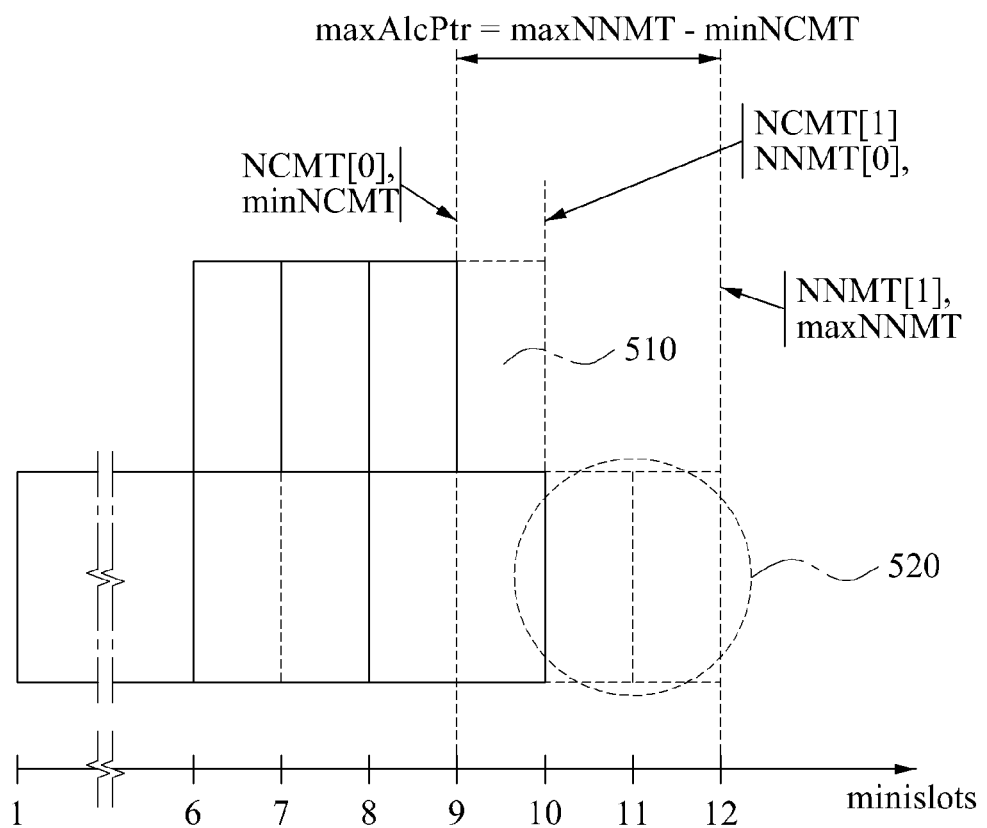
FIG. 5 illustrates performing normalization based on a load balancing algorithm according to an embodiment of the present invention.

FIG. 5 illustrates performing normalization based on a load balancing algorithm according to an embodiment of the present invention.

As illustrated in FIG. 5, the load balancing algorithm may be implemented based on a smallest minislot 510, among minislots having at least one different size.

That is, the load balancing algorithm may segment a relatively large minislot into a plurality of relatively small minislots through normalization, thereby setting the plurality of relatively small minislots segmented to be a minimum unit for bandwidth allocation.

In other words, in a case of a relatively large minislot 520, bandwidth allocation for load balancing corresponding to a factor of n of a unit which is segmented into relatively small minislots for band allocation may be valid.

Figure 6:
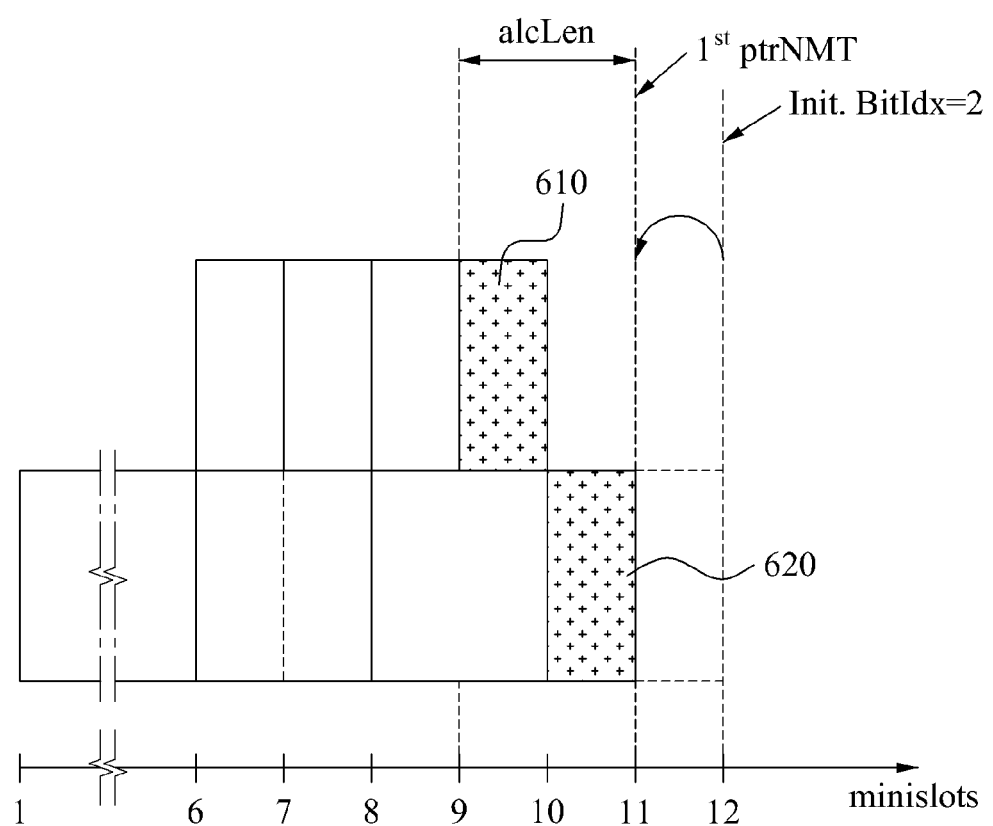
FIGS. 6 and 7 illustrate examples of application of a binary search scheme to proceed after normalization based on a load balancing algorithm according to an embodiment of the present invention.
Figure 7:
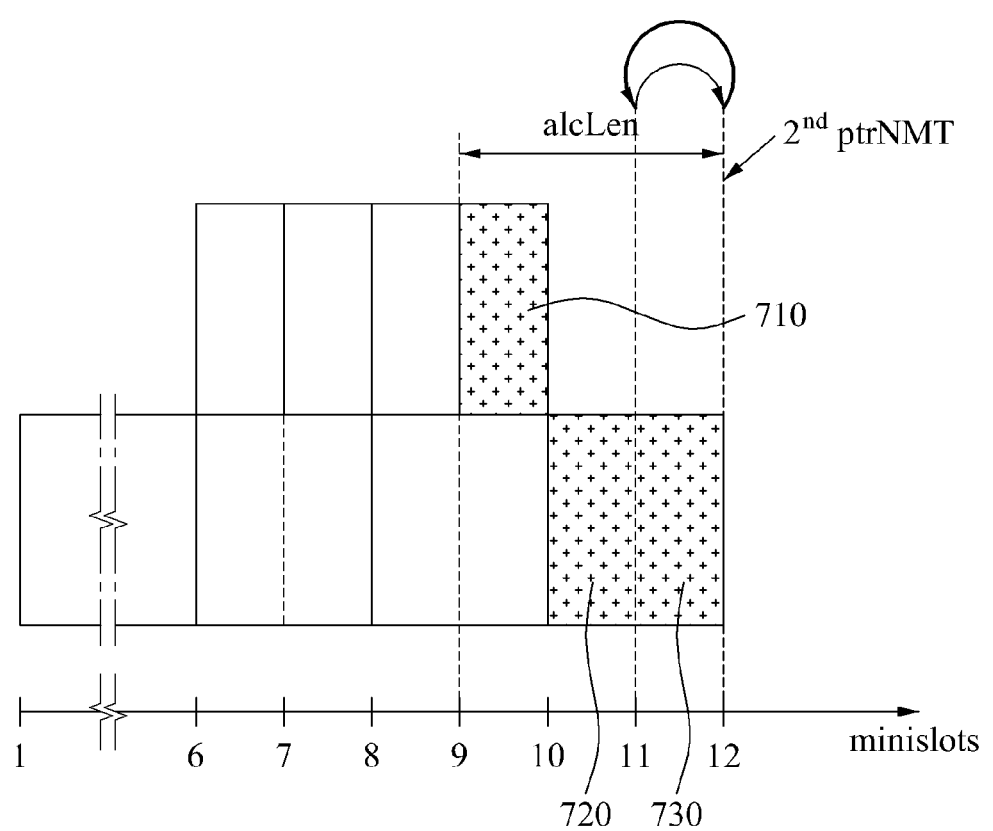

FIGS. 6 and 7 illustrate examples of application of a binary search scheme to proceed after normalization based on a load balancing algorithm according to an embodiment of the present invention.

The binary search may be used to calculate an allocation length (alcLen) using a bit index (BitIdx) of a minislot, and to allocate a bandwidth to an upstream channel of at least one modem, by reflecting, in the calculated allocation length, a minimum value (ptrNMT) in an allocation region.

In FIG. 6, a value of the ptrNMT may be calculated by Equation 1.

For ease of description, let an initial value of BitIdx be "2."

$$\text{alcLen}=0, \text{BitIdx}=2$$

$$\text{alcLen}(2)=\text{alcLen}(0)+2^{(BitIdx-1)}$$

$$\text{ptrNMT}(11)=\text{minNCMT}(9)+\text{alcLen}(2) \quad \text{[Equation 1]}$$

In Equation 1, alcLen(0) denotes an initial value of alcLen, and indicates the initial value of the alcLen corresponds to "0." alcLen(2) denotes a value of the alcLen which is changed from the initial value, and may be construed that the changed value of the alcLen corresponds to "2."

Similarly, numbers in parentheses of ptrNMT(11), minNCMT(9), and alcLen(2) may be construed as actual values of respective corresponding variables.

Similar to FIG. 6, in FIG. 7, Equation 2 may be implemented iteratively until a value of BitIdx corresponds to "1."

In this instance, when values from the previous process succeed, the value of the BitIdx may be reduced by "1."

$$\text{alcLen}=2$$

$$\text{BitIdx}=\text{BitIdx}-1, \text{ that is, BitIdx}=1$$

$$\text{alcLen}(3)=\text{alcLen}(2)+2^{(BitIdx-1)}$$

$$\text{ptrNMT}(12)=\text{minNCMT}(9)+\text{alcLen}(3) \quad \text{[Equation 2]}$$

Since the value of the BitIdx corresponds to "1" by the process of FIG. 7, the process of calculating the value of the ptrNMT may be terminated.

Accordingly, final load-balanced slots may appear as minislots 710, 720, and 730 indicated using a second hatching pattern, as shown in FIG. 7.

Figure 8:
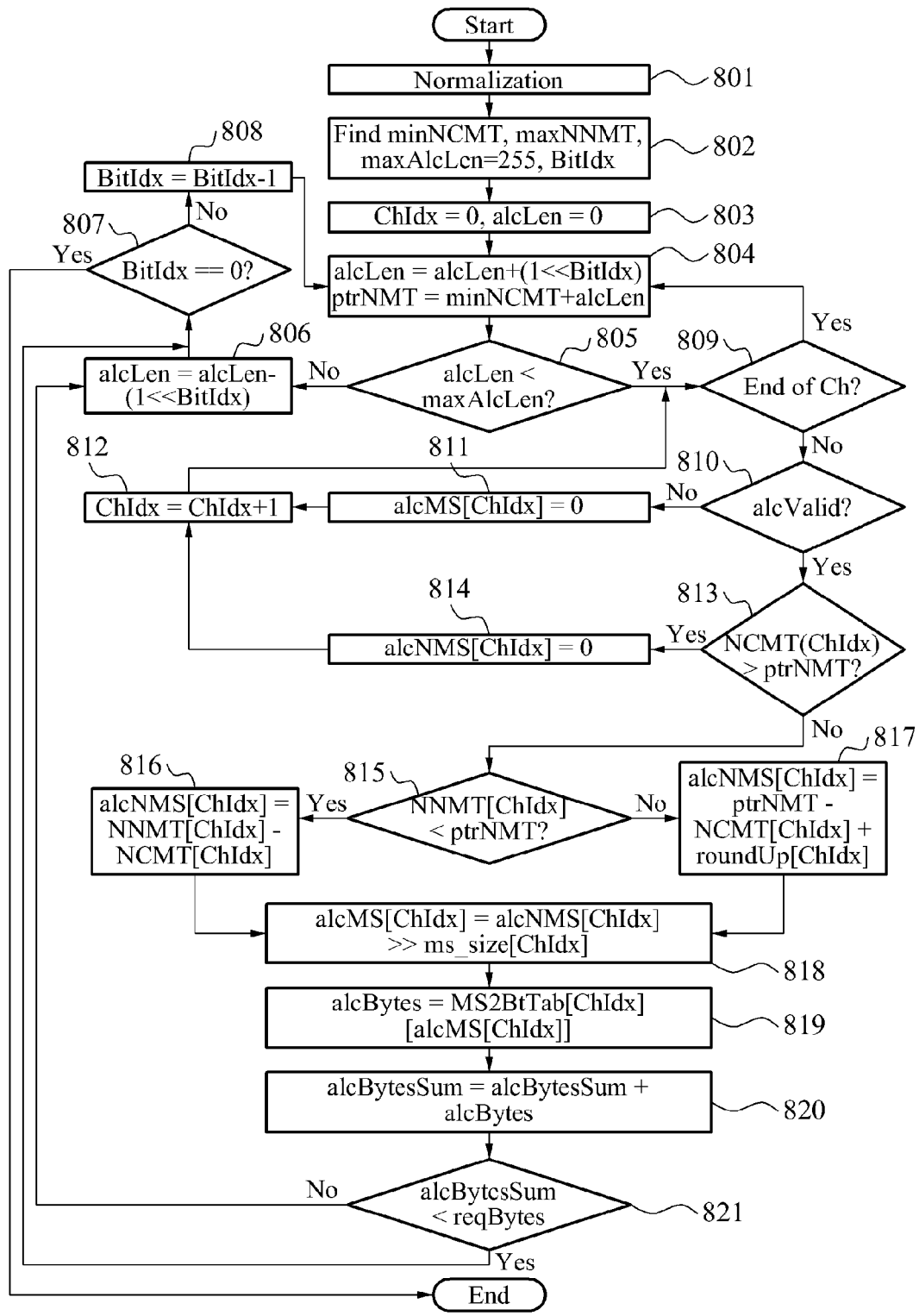
FIG. 8 is a flowchart illustrating a load balancing bandwidth allocation method using a load balancing algorithm according to an embodiment of the present invention.

FIG. 8 is a flowchart illustrating a load balancing bandwidth allocation method using a load balancing algorithm according to an embodiment of the present invention.

In the load balancing bandwidth allocation method, a bandwidth allocation request signal may be received from at least one modem, and a bandwidth may be allocated to an upstream channel of the at least one modem, using the load balancing algorithm, in response to the received bandwidth allocation request signal.

In this instance, in order to allocate the bandwidth to the upstream channel, minislots having different sizes may be normalized based on a smallest minislot among the minislots having different sizes.

In addition, in order to allocate the bandwidth to the upstream channel, the bandwidth may be allocated to the upstream by applying a binary search to the minislots having different sizes.

Further, in order to allocate the bandwidth to the upstream channel, an allocation length (alcLen) may be calculated using a bit index (BitIdx) of a minislot, and the bandwidth may be allocated to the upstream channel of the at least one modem, by reflecting, in the calculated allocation length, a minimum value (ptrNMT) in an allocation region.

That is, in the load balancing bandwidth allocation method, normalization may be performed with respect to minislots in operation 801.

In operation 802, a value of minNCMT and a value of maxNNMT may be found.

Generally, a value of maxAlcLen is determined to "255" in Data over Cable Service Interface Specification (DOCSIS). In addition, an initial value of BitIdx may be set to "16" in the present invention.

A value of ChIdx and a value of alcLen may be initialized to "0" in operation 803, and a value of alcLen and a value of ptrNMT may be calculated by Equation 4 in operation 804.

$$\text{alcLen} = \text{alcLen} + (1 << \text{BitIdx}) \quad \text{[Equation 4]}$$

In Equation 4, "1<<BitIdx" indicates raising "2" to the power of BitIdx. For example, 1<<K is identical to 2^K.

In operation 805, the value of alcLen may be compared to the value of maxAlcLen. When the value of the alcLen is greater than the value of maxAlcLen, the method goes to operation 806. When the value of the alcLen is less than the value of maxAlcLen, the method goes to operation 809.

When the value of the alcLen is greater than the value of maxAlcLen, the value of the alcLen may be calculated using Equation 5 in operation 806, and whether the value of the BitIdx corresponds to "0" may be determined in operation 807.

$$\text{AlcLen} = \text{alcLen} - (1 << \text{BitIdx}) \quad \text{[Equation 5]}$$

When the value of the BitIdx corresponds to "0" as a result of operation 807, the current process may be terminated. When the value of the BitIdx does not correspond to "0," the value of the BitIdx may be reduced by a value of "1" in operation 808.

When the value of the alcLen is less than the value of maxAlcLen as a result of operation 805, whether a portion currently being verified corresponds to an end of a channel provided by DOCSIS may be verified in operation 809.

From DOCSIS 3.0, channel bonding which enables at least two channels to be used simultaneously is provided. The term "the end of the channel provided by DOCSIS" may refer to a channel to which a bandwidth may be allocated last of all when the bandwidth is allocated to bonded channels sequentially. In the flowchart of FIG. 8, different values of the ChIdx are assigned to channels, respectively.

In operation 810, whether bandwidth allocation to a channel is valid may be verified. Operation 810 may be performed in order to skip a channel in the bandwidth allocation process when a bandwidth is already allocated to the channel and further bandwidth allocation to the channel is invalid.

A bandwidth may not be allocated to a corresponding channel by Equation 6 in operation 811, and the value of the ChIdx may be increased by "1" in operation 812.

$$\text{alcMS}[\text{ChIdx}] = 0 \quad \text{[Equation 6]}$$

In Equation 6, alcMS[ChIdx] denotes a memory to store a number of minislots to be assigned to a channel corresponding to the value of the ChIdx.

When the bandwidth allocation to the channel is valid as a result of operation 810, whether a value of NCMT of the channel corresponding to the value of the ChIdx is greater than the value of the ptrNMT may be verified in operation 813. When the value of the NCMT of the channel corresponding to the value of the ChIdx is greater than the value of the ptrNMT, the method goes to operation 814. When the value of the NCMT of the channel corresponding to the value of the ChIdx is less than or equal to the value of the ptrNMT, the method goes to operation 815.

In operation 814, a value of alcNMs of a corresponding channel may be set to "0" by Equation 7.

$$\text{alcNMS}[\text{ChIdx}] = 0 \quad \text{[Equation 7]}$$

In Equation 7, alcNMS[ChIdx] denotes a memory to store a number of normalized minislots to be assigned to a channel corresponding to the value of the ChIdx.

In operation 815, whether a value of NNMT corresponding to the value of the ChIdx is less than the value of the ptrNMT may be verified. When the value of the NNMT is less than the value of the ptrNMT as a result of verification, the method goes to operation 816. When the value of the NNMT is greater than or equal to the value of the ptrNMT, the method goes to operation 817.

In operation 816, a value of the alcNMS[ChIdx] may be calculated by Equation 8.

$$\text{alcNMS}[\text{ChIdx}] = \text{NNMT}[\text{ChIdx}] - \text{NCMT}[\text{ChIdx}] \quad \text{[Equation 8]}$$

In operation 817, the value of the alcNMS[ChIdx] may be calculated by Equation 9.

$$\text{alcNMS}[\text{ChIdx}] = \text{ptrNMT} - \text{NCMT}[\text{ChIdx}] + \text{roundUp}[\text{ChIdx}] \quad \text{[Equation 9]}$$

In operation 818 which may be performed after one of operation 816 and operation 817, the value of the alcMS[ChIdx] may be calculated by Equation 10.

$$\text{alcMS}[\text{ChIdx}] = \text{alcNMS}[\text{ChIdx}] >> \text{ms\_size}[\text{ChIdx}] \quad \text{[Equation 10]}$$

In Equation 10, "A>>B" denotes an operation of dividing A by 2B.

In operation 819, a value of alcBytes may be calculated by Equation 11.

$$\text{alcBytes} = \text{MS2BtTab}[\text{ChIdx}][\text{alcMS}[\text{ChIdx}]] \quad \text{[Equation 11]}$$

In Equation 11, alcBytes denotes an amount of a bandwidth allocated to a corresponding channel, expressed using bytes. In addition, MS2BtTab[ChIdx][alcMS[ChIdx]] denotes sizes of data to be included in a minislot to be allocated to a channel having the value of the ChIdx, expressed using units of bytes.

In operation 820, the value alcBytesSum may be calculated by Equation 12.

$$\text{alcBytesSum} = \text{alcBytesSum} + \text{alcBytes} \quad \text{[Equation 12]}$$

In Equation 12, alcBytesSum denotes a sum of values of bytes allocated to all channels and calculated thus far.

In operation 821, whether a value of the alcBytesSum is less than a value of reqBytes may be verified. When the value of the alcBytesSum is less than the value of the reqBytes, the method returns to operation 807. When the value of the alcBytesSum is greater than or equal to the value of the reqBytes, the method returns to operation 806.

Here, reqBytes denotes a sum of bandwidths requested by a cable model to a cable modem termination system (CMTS).

According to an embodiment of the present invention, it is possible to provide a load balancing bandwidth allocation algorithm that performs load balancing more rapidly.

In addition, according to an embodiment of the present invention, it is possible to perform fast load balancing between channels at a time of bandwidth allocation in a broadcast and communication system.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A load balancing bandwidth allocation apparatus, comprising:
   a bandwidth allocation request receiving unit to receive a bandwidth allocation request signal from at least one modem; and
   a bandwidth allocation processing unit to allocate a bandwidth to an upstream channel of the at least one modem, using a load balancing algorithm, in response to the received bandwidth allocation request signal,
   wherein said load balancing algorithm normalizes minislots having different sizes, based on a smallest minislot among the minislots having different sizes, and allocates a bandwidth to the upstream channel, by applying a binary search to the minislots having different sizes, and
   wherein the binary search is used to calculate an allocation length using a bit index of a minislot, and to allocate a bandwidth to the upstream channel of the at least one modem, by reflecting, in the calculated allocation length, a minimum value in an allocation region.

2. The apparatus of claim 1, wherein the bandwidth allocation processing unit sets an initial value of the allocation length to "0," and sets an initial value of the bit index to "16."

3. A load balancing bandwidth allocation method, comprising:
   receiving a bandwidth allocation request signal from at least one modem; and allocating a bandwidth to an upstream channel of the at least one modem, using a load balancing algorithm, in response to the received bandwidth allocation request signal, wherein the allocating comprises normalizing minislots having different sizes, based on a smallest minislot among the minislots having different sizes, and the allocating further comprises:
   allocating a bandwidth to the upstream channel, by applying a binary search to the minislots having different sizes; and
   calculating an allocation length using a bit index of a minislot; and allocating a bandwidth to the upstream channel of the at least one modem, by reflecting, in the calculated allocation length, a minimum value in an allocation region.

* * * * *